United States Patent [19]
Boulet d'Auria

[11] Patent Number: 5,229,581
[45] Date of Patent: Jul. 20, 1993

[54] ELECTRO-WELDING ELEMENT OF CONDUCTIVE PLASTIC AND AN ELECTRO-WELDING COUPLING INCLUDING SAID ELEMENT FOR INTERCONNECTING PIECES MADE OF PLASTIC

[75] Inventor: Vincent S. Boulet d'Auria, Cap d'Ail, France

[73] Assignee: Boulet d'Auria, Terlizzi et Cie, Monaco

[21] Appl. No.: 535,404

[22] Filed: Jun. 8, 1990

[30] Foreign Application Priority Data

Jun. 9, 1989 [FR] France ............... 89 07646

[51] Int. Cl.$^5$ .................. H05B 3/58; H05B 3/08; F16L 13/02
[52] U.S. Cl. ...................... 219/535; 219/517; 219/541; 219/544; 285/286
[58] Field of Search ............. 219/535, 548, 517, 544, 219/549, 528, 541, 522; 285/22, 286; 264/272.11; 337/405, 403, 406, 299, 298, 297, 414, 415

[56] References Cited

U.S. PATENT DOCUMENTS

| | | | |
|---|---|---|---|
| 3,378,672 | 4/1968 | Blumenkranz | 219/200 |
| 3,576,387 | 4/1971 | Derby | 174/36 |
| 4,675,512 | 6/1987 | Doucet et al. | 219/535 |
| 4,775,501 | 10/1988 | Rosenzweig et al. | 219/535 |
| 4,855,574 | 8/1989 | Lodder et al. | 219/535 |
| 5,003,163 | 3/1991 | Jensen | 219/535 |

FOREIGN PATENT DOCUMENTS

| | | |
|---|---|---|
| 0093821 | 11/1983 | European Pat. Off. . |
| 0115191 | 8/1984 | European Pat. Off. . |
| 0145581 | 8/1985 | European Pat. Off. . |
| 0278553 | 8/1988 | European Pat. Off. . |
| 1048106 | 12/1958 | Fed. Rep. of Germany . |
| 2635363 | 2/1978 | Fed. Rep. of Germany . |
| 1493562 | 7/1967 | France . |
| 2586036 | 2/1987 | France . |
| 8002124 | 10/1980 | PCT Int'l Appl. . |
| 8706182 | 10/1987 | PCT Int'l Appl. . |
| 8806517 | 9/1988 | PCT Int'l Appl. . |
| 336980 | 4/1959 | Switzerland . |
| 528697 | 11/1972 | Switzerland . |
| 532996 | 3/1973 | Switzerland . |
| 1265194 | 3/1972 | United Kingdom . |

*Primary Examiner*—Bruce A. Reynolds
*Assistant Examiner*—Michael D. Switzer
*Attorney, Agent, or Firm*—Bachman & LaPointe

[57] ABSTRACT

The invention relates to an electro-welding element for interconnecting two pieces made of plastic, the electro-welding element being made of conductive plastic, either an intrinsically conductive plastic or an extrinsically conductive plastic. In a preferred embodiment, the electro-welding element includes an electro-welding portion constituted by two cylindrical sleeves and a thermoregulation portion constituted by a central portion interconnecting the two sleeves. An electro-welding coupling for interconnecting two tubes made of plastic may be formed by overmolding a plastic sleeve onto the electro-welding element, the sleeve being provided with power supply terminals.

13 Claims, 3 Drawing Sheets

ELECTRO-WELDING ELEMENT OF CONDUCTIVE PLASTIC AND AN ELECTRO-WELDING COUPLING INCLUDING SAID ELEMENT FOR INTERCONNECTING PIECES MADE OF PLASTIC

The present invention relates to a method of making an electro-welding coupling for interconnecting two pieces made of thermo-plastic material, and to an electro-welding coupling obtained by implementing the method.

BACKGROUND OF THE INVENTION

Electro-weldable sleeves are designed in particular to make a connection between thermo-plastic tubes, e.g. tubes constituting pipework for distributing gas or water or other fluids and made, in general, of polyethylene.

The conventional electro-welding technique consists in heating contacting surfaces of the pieces by means of an electrical resistance heater wire embedded in a coupling, thereby reaching the welding temperature of the materials used. In general, such couplings are made by injection molding over the heater wire.

Unless otherwise specified, the term "plastic" is used herein in its commonly-accepted broad sense of "thermo-plastic material", and in particular it is used to cover such material when in its hard state, i.e. when it is not plastic in the narrow sense of the word.

Over the last ten years or so, Japanese and American laboratories have developed revolutionary materials constituted by intrisically conductive polymers. These polymers are conductive because of doping ions (iodine, sodium, mercury, . . . ) included therein that facilitate the free displacement of electrons along the chain, i.e. the conduction of electricity.

In addition to their own characteristics (mechanical qualities, lightness, ease of implementation, manufacturing cost, . . . ), these plastics also provide electrical conductivity to a degree which can be adjusted by modifying the concentration of dopant.

Several applications have since been developed. Firstly, these materials can be used to store energy in electric cells or batteries made entirely of plastic or having electrodes made of plastic. A battery cell having polyaniline electrodes is now commercially available. Another intended application is the manufacture of display screens that make use of the change in color that occurs in some polymers when subjected to an electrical voltage. Another line of development relates to a conductive molecular thread made of polymer and used as a chain for transferring information between an electrode and sensitive functional groups grafted on the thread.

More conventional extrinsically conductive plastics have also been developed which contain a filler of metal fibers or powder, or of carbon black.

French patent number 2 586 036 (Kao Corporation and Yoshino) describes a method of preparing an intrinsically conductive polymer. In this method, an electrolyte and a monomer in the form of an aromatic compound or of a derivative thereof are dissolved or dispersed in a polar organic medium, and electro-chemical anode oxidation is performed in the resulting solution or dispersion in the presence of at least one metal ion, the said metal ion being selected from: copper, bivalent silver, trivalent iron, trivalent manganese, ruthenium, rhenium, and rhodium.

French patent number 2 586 133 (Protavic) describes an improved extrinsically conductive polymer composition containing finely-divided nickel. In such compositions, electrical conductivity is essentially due to metal particles establishing mutual electrical contact between one another, which particles may be silver, nickel, aluminum, copper, . . .

The present invention relates to a novel application of such extrinsically or intrinsically conductive plastics. It relates to a method of making electro-welding couplings by using an electro-welding insert made of such plastics.

The main advantage of the method lies in its ease of implementation and in its low manufacturing costs. As demonstrated by the numerous patents filed in this field, serious problems of reliability and welding quality arise with the installation of a conventional helical heater wire in or on a plastic former.

The main drawback of such methods lies in the problem of the risk of the heater wire expanding and moving both before and during overmolding.

Prior to overmolding, the wire is held in place solely by being under tension around the surface of the former. However, this tension may be faulty, for example due to an operator error during winding or during storage because of a change in the sleeve's diameter due to ambient atmospheric conditions, in particular excessive humidity.

In addition, it is difficult to adjust the tension to be applied to the wire while it is being wound on the grooved sleeve. The wire must be under considerable tension in order to be received reliably in the bottom of the helical groove. However, the wire must not be under excessive tension since, in that case, its diameter is reduced and the resistance finally obtained is greater than that which is desired, thereby giving rise to problems during electro-welding.

The wire may also move during overmolding because of forces due to the viscosity of the plastic being overmolded.

These displacements, if they occur, reduce the quality of the weld, giving rise to non-uniform heat distribution. They also run the risk of causing pockets of air to be created in the coupling, and these too reduce weld quality.

A heating insert may also be used inside a coupling for the purpose of making a branch connection via a hole made in situ in a duct.

Such couplings are generally made in two portions which receive the duct. The hole is made after welding by heating the duct in the zone where the hole is to be made, with the heating being obtained by means of a heating electrical resistance.

In the same manner as for a connection sleeve, attempts have been made to provide a prefabricated heating insert for such a branch coupling.

In the prior art as described, for example, in French patent number 2 171 223 (Rollmaplast AG), an insulated resistor wire in the form of a spiral or in some other form is embedded in the bulk of a saddle-shaped portion by overmolding.

In contrast, a prefabricated insert is described in French patent number 2 519 578 (Innovation Technique Sam). This insert comprises a relatively thin molded plate including a groove in which a spiral-shaped heater wire is installed. The insert is intended to be incorporated in the inside face of the saddle, preferably while the saddle is being molded.

As shown by these prior documents, installing a spiral heater wire in this case also gives rise to problems of reliability and welding quality.

The above-mentioned problems of heater wire displacement, expansion, and adjustment in electro-welding formers apply in this case as well.

The method of the invention lends itself to making a coupling which is self-fusing, i.e. a very simple disposition causes the flow of electricity to be interrupted automatically when the energy required for welding has been dissipated.

In prior electro-welding connections, devices for interrupting the flow of electricity are relatively complex.

According to French patent number 2 572 327 (Toutelectric Sam MC), a device for controlling welding time includes a relay connected in a main circuit for manual switching and for switching under the control of a microswitch itself controlled by the pressure of the molten substance expanding during the welding operation. Such microswitches are disposed in wells close to the power supply terminals and hollowed out in the wall of the sleeve or the saddle down to the vicinity of the windings. This device for controlling welding time is adaptable to sleeves for connecting tubular elements and also to saddles for making a branch connection by making a hole in a tubular element.

According to European patent number 229 743 (Geberit AG) the coupling is provided, adjacent to each terminal, with a sleeve containing a temperature indicator in the form of a thin disk having a color coating whose color changes with temperature. This temperature indicator co-operates with an optical sensor which switches off the power supply when the disk takes on a determined color.

According to European patent number 93 821 (Geberit AG), the conductor wire is provided with a switch designed to break the wire when the energy required for welding has been transmitted.

Unlike these complex arrangements for interrupting electro-welding, the present invention proposes a particularly simple system for thermal regulation of the weld, which system requires no additional device to be installed and is capable of being implemented simply during molding of the electro-welding insert since the thermal regulator elements are constituted by integral portions of the insert.

SUMMARY OF THE INVENTION

The present invention thus provides an electro-welding element for connecting together two elements made of plastic, the electro-welding element being remarkable in that it is constituted by a conductive plastic; this conductive plastic may be an intrinsically conductive plastic, i.e. a polymer doped with ions (of iodine, sodium, mercury, . . . ); or it may be an extrinsically conductive plastic, i.e. a plastic containing a filler of metal fibers or powder, or of carbon black,. . . .

The invention thus eliminates any need to insert a heater wire or its equivalent, with electricity being conducted directly by the plastic which constitutes the electro-welding element.

The invention also eliminates any need to install additional devices for interrupting the flow of electricity since the electro-welding element includes at least one integrated thermal regulation portion, made of the same plastic as the remainder of the element.

In addition, the present invention provides a disposition for the power supply terminals which is particularly simple and advantageous. These terminals are delivered as piece parts, and after the pieces to be welded together and the electro-welding element have been put into position, each piece part is installed merely by being inserted into the electro-welding element made of conductive plastic, e.g. by having one end screwed into said element, thereby providing a path for the flow of electricity.

By implementing its terminals in this way and by omitting any heater wire, the present invention thus eliminates any need for complex and difficult connection between a heater wire and power supply terminals.

In a first preferred embodiment, intended in particular for connecting together tubular elements, the electro-welding element includes an electro-welding portion constituted by at least one sleeve, and preferably by two cylindrical sleeves and a thermal regulation portion constituted by a central portion interconnecting the two electro-welding sleeves and disposed in such a manner as to cause electricity to flow uniformly through the conductive plastic of the sleeves.

This regulation portion is preferably constituted by at least one strip interconnecting the sleeves.

In a second preferred embodiment, designed in particular for providing a branch connection via a hole, the electro-welding element comprises an electro-welding portion in the form of a part-circular plate to which the portions intended to receive the power supply terminals are connected via thermal regulation portions which are preferably constituted by strips extending along circular arcs.

The invention also relates to the application of said electro-welding element to making an electro-welding coupling for interconnecting tubes and to making an electro-welding coupling for providing a branch connection via a hole formed in situ in a tube.

BRIEF DESCRIPTION OF THE DRAWINGS

Embodiments of the invention are described by way of example with reference to the accompanying drawings, in which.

DETAILED DESCRIPTION

Figure 1:
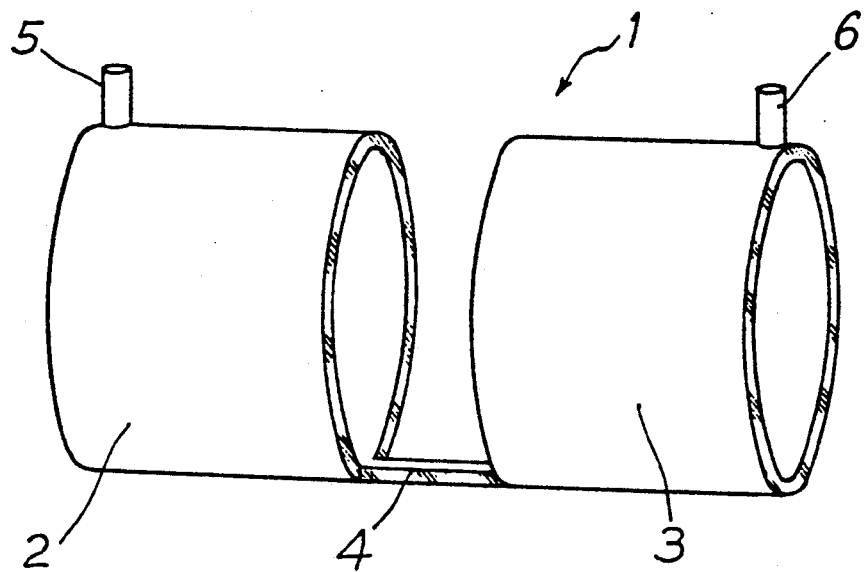
FIG. 1 is a perspective view of an electro-welding element of the invention designed in particular for interconnecting plastic tubes.
Figure 2:
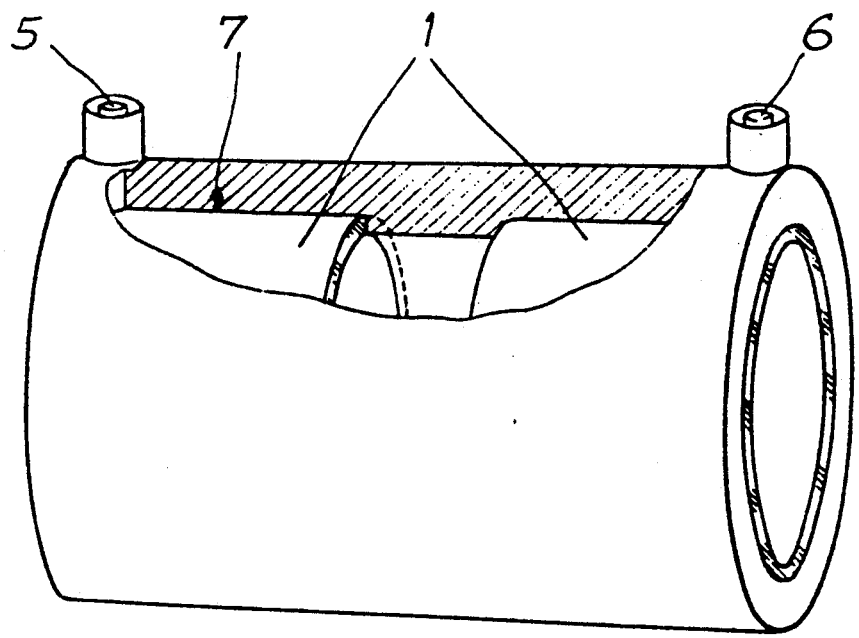
FIG. 2 is a perspective view of an electro-welding coupling for interconnecting plastic tubes and including the element of FIG. 1.

FIGS. 1 and 2 show a first preferred embodiment of an element of the invention.

The electro-welding element 1 is made of conductive plastic. The plastic is either an intrinsically conductive plastic, i.e. a polymer doped with ions (of iodine, sodium, mercury, . . . ), or else it is an extrinsically conductive plastic, i.e. having a filler of metal fibers or powder, or of carbon black, . . . .

The element 1 comprises two electro-welding portions 2 and 3 each constituted by a cylindrical sleeve of appropriate thickness and composition to deliver the heat required for welding together two tubes that are to be interconnected. These two electro-welding portions 2 and 3 are interconnected by a central portion 4 constituting the thermoregulation portion. The element 1 is also provided with two portions 5 and 6 for receiving power supply terminals.

The thermoregulation portion 4 is disposed so as to cause electricity to flow uniformly through the meltable material of the sleeves. To do this, it is constituted by a strip of meltable material interconnecting the two sleeves 2 and 3 and it is situated in line with the sleeves which are themselves in alignment, lying on the generator line which is diametrically opposite to that on which the portions 5 and 6 for receiving the power supply terminals lie. In addition, its dimensions are determined so that when sufficient heat has been given off by conduction through the conductive plastic to achieve melting and thus welding together of the contacting surfaces of the element and the tubes to be connected, said strip 4 is destroyed, thereby breaking the electrical circuit between the terminals and thus automatically interrupting the electro-welding process.

FIG. 2 shows the preferred application of the element 1 to providing a coupling. The element constitutes an electro-welding insert 1, and an outer sleeve 7 is injection molded thereover to make a coupling. The tubes to be interconnected are then inserted into respective ends of the coupling, after which the power supply terminals are installed in the portions 5 and 6, and the assembly is then ready for electro-welding.

Since conductive plastic is injectable, the insert may be given all sorts of shapes.

Figure 3:
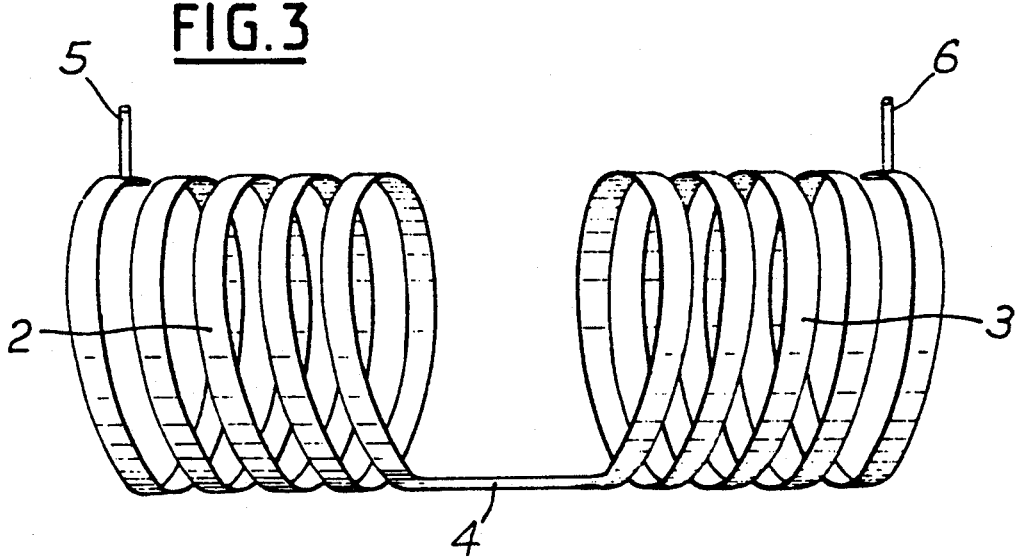
FIG. 3 is a perspective view of a variant electro-welding element of the invention, designed in particular for interconnecting tubes.
Figure 4:
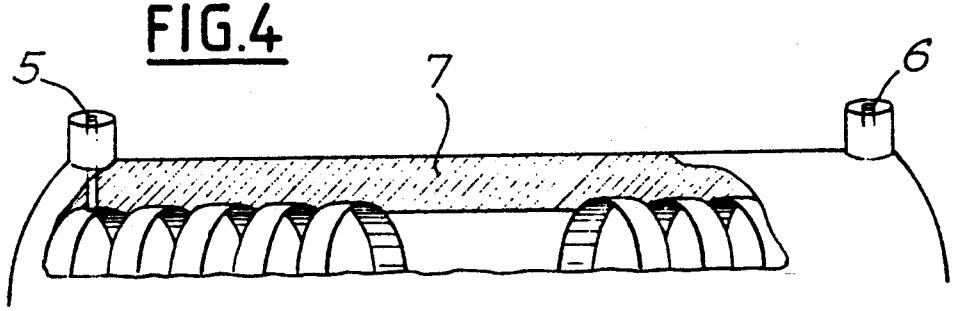
FIG. 4 is a fragmentary perspective view of an electro-welding coupling made using the element of FIG. 3.

FIGS. 3 and 4 show a variant embodiment of the electro-welding element and of the electro-welding coupling described above.

In this variant, as can be seen in FIG. 3, the cylindrical sleeves are not solid but are constituted by a helically wound strip of conductive plastic. The same strip then constitutes both the sleeves and the rectilinear central thermal regulation portion 4. In the example shown in FIG. 3, the two coils 2 and 3 are wound in opposite directions, however the two coils 2 and 3 could equally well be wound in the same direction.

The thermal regulation strip 4 is disposed and dimensioned in the same manner as for the example shown in FIG. 1.

FIG. 4 is a fragmentary view of an electro-welding coupling for tubes made using such an electro-welding element 1 inside an overmolded outer sleeve 7.

Figure 5:
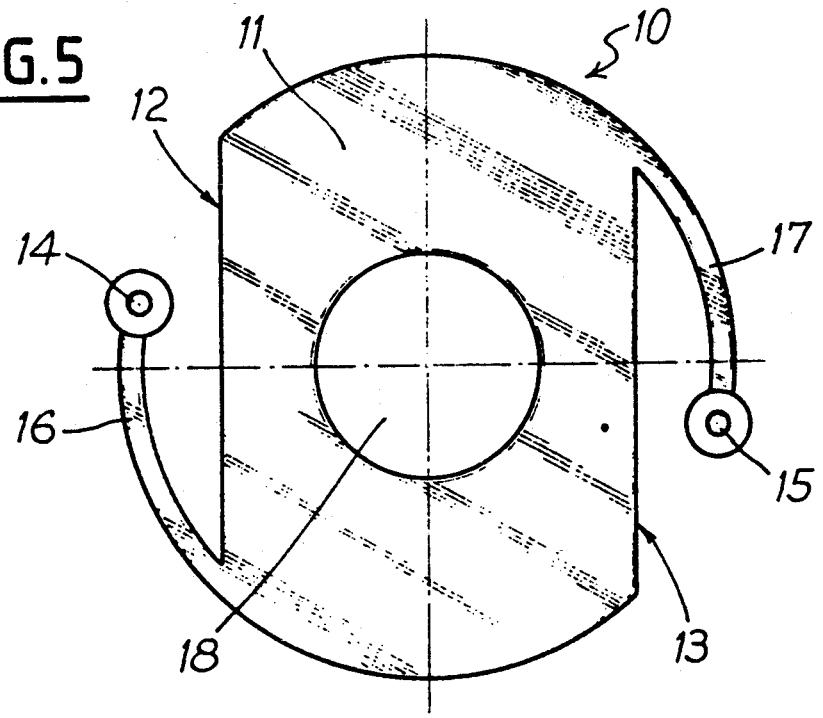
FIG. 5 is a plan view of an electro-welding element of the invention designed in particular for use in making an electro-welding branch coupling by making a hole in a tube.

FIG. 5 shows a second preferred embodiment of the electro-welding element of the present invention.

It is likewise made of conductive plastic. This plastic is either an intrinsically conductive plastic, i.e. a polymer doped with ions (of iodine, sodium, mercury, . . . ), or else an extrinsically conductive plastic, i.e. one including a filler of metal fibers or powder, or of carbon black, . . . .

The electro-welding element 10 shown as seen from above is constituted by a plate of conductive plastic and it is generally part-circular in shape. It includes an electro-welding portion 11 constituted by a disk in the form of a circle truncated between two parallel lines 12 and 13. The portions for installing the power supply terminals 14 and 15 are disposed diametrically opposite each other on said truncated portion and are connected to the truncated disk 11 via two thermoregulation portions 16 and 17 each constituted by a strip of conductive plastic disposed along the periphery of the circle constituting the overall outline of the element 10.

These thermoregulation strips 16 and 17 are disposed so as to cause electricity to flow uniformly through the meltable material of the plate 11. To do this, they are symmetrically disposed about the center of the disk. In addition, they are dimensioned so that when the heat delivered by conduction through the conductive plastic is sufficient to achieve melting and thus welding of the contacting surfaces of the element 11 and of the pieces to be welded together, then the portions 16 and 17 are destroyed, thereby interrupting the circuit constituted between the terminals disposed at 14 and 15, thus automatically interrupting the electro-welding process.

The electro-welding element 11 is also provided with a central orifice 18 corresponding to the central location for making a hole for a branch connection, and where welding is not required.

The electro-welding element 10 is designed for making an electro-welding coupling for making a branch connection via a hole through a plastic tube. To do this, the element 11 constitutes an insert having a saddle-forming connection portion molded thereover, and intended in turn to be fixed on pipework in which the hole is made.

Figure 6:
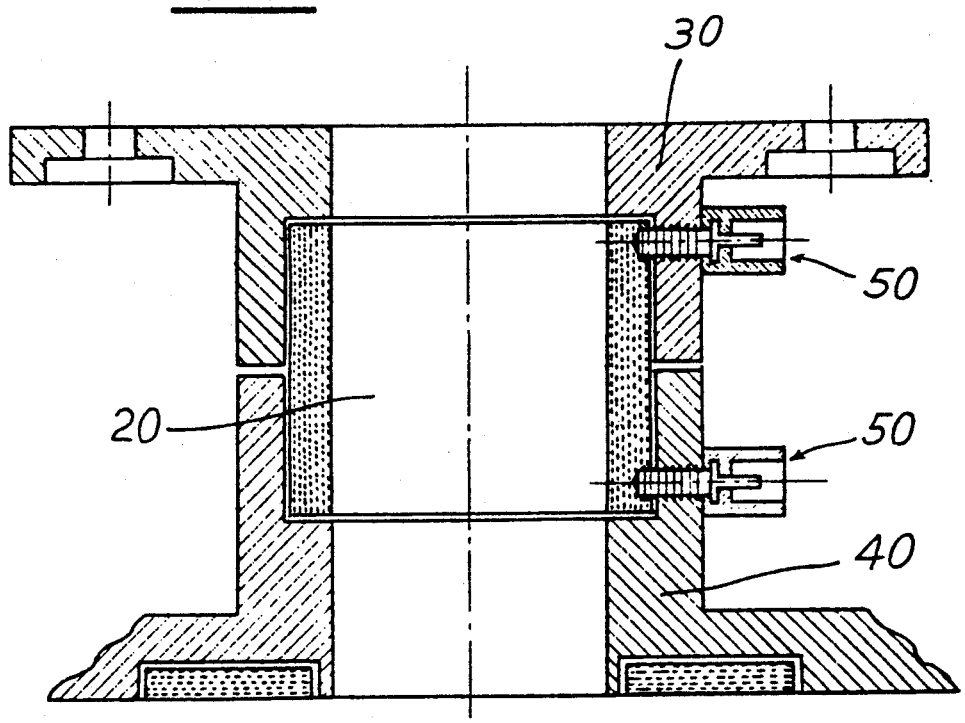
FIG. 6 is a section view through an example of an application of an electro-welding element of the invention.

FIG. 6 is a section through another disposition of an electro-welding element of the invention.

The sleeve 20 is intended to interconnect two parts 30 and 40 each having a hollow in its portion to be connected, said hollow receiving the electro-welding element 20 which is in the form of a sleeve, only.

Two power supply terminals 50 (described in greater detail below) are screwed into link portions of the parts 30 and 40 and to a certain depth through the thickness of the electro-welding sleeve 20 for the purpose of applying power thereto, and thus performing electro-welding.

This method of installing the electro-welding insert may also be applied to making couplings for interconnecting tubes or for making branch connections as described above. Such couplings can be made without any overmolding. The electro-welding insert is then received or housed by nesting or an equivalent technique in a prefabricated outer sleeve 7 or saddle. In which case, the electro-welding elements, the outer sleeves and the branch connection saddles are manufactured in modular manner and are fitted together in situ when welding is to be performed.

Finally, in an embodiment which is preferred for being cheapest, the insert and the outer element may be injected in a single operation into a mold having an extensible core. This type of manufacture can reduce the cost price of such a product by more than 50%.

Figure 7:
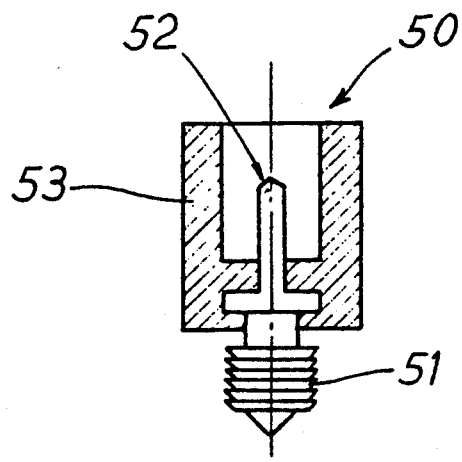
FIG. 7 is a fragmentary section view through a power supply terminal of the invention.

FIG. 7 shows an embodiment of a power supply terminal 50. This terminal is intended to be inserted through the outer portion surrounding the electro-welding element and also into the electro-welding element itself in order to pass electricity through the said electro-welding element. This insertion is preferably achieved by means of a screw connection and to do this the terminal includes a self-tapping portion 51 provided with a tip and a thread suitable for being screwed directly into the plastic of the outer portion and of the element. It also includes a conventional electrical connection portion 52 and a conventional envelope 53 preferably made of plastic.

In general, when using an extrinsically conductive plastic, the nature of the filler is defined as a function of the required energy and the filler may be distributed nonuniformly, e.g. so as to be less dense at the surface than inside the element so as to adjust conduction according to needs.

I claim:

1. An electro-welding element for interconnecting two pieces made of plastic, said element comprising a welding element of a conductive plastic including at least one integral thermoregulation portion constituted by a conductive plastic wherein the thermoregulation portion is a central portion interconnecting two electro-welding sleeves, said integral thermoregulation portion having a shape arranged to provide a thermoregulation effect during the welding of said welding element, wherein said welding element further comprises at least one electro-welding portion constituted by at least one cylindrical sleeve.

2. An electro-welding element for interconnecting two pieces made of plastic, said element comprising a welding element of a conductive plastic including constituted at least one integral thermoregulation portion constituted by a conductive plastic, said integral portion having a shape arranged to provide a thermoregulation effect during the welding of said welding element, wherein said welding element further comprises at least one electro-welding portion constituted by at least one cylindrical sleeve, and wherein said thermoregulation portion is constituted by at least one strip of conductive plastic disposed in line with said sleeve along a generator line which is diametrically opposite to a generator line on which portions for installing terminals are situated.

3. The electro-welding element according to claim 1, wherein said thermoregulation portion is disposed in such a manner as to cause electricity to flow uniformly through the material of said element.

4. The electro-welding element according to claim 1, wherein said thermoregulation portion is constituted by at least one strip of conductive plastic interconnecting the electro-welding sleeves.

5. An electro-welding coupling for interconnecting two plastic tubes, the coupling comprising an electro-welding element according to claim 1, an outer sleeve made of non-conductive plastic, and power supply terminals.

6. A coupling according to claim 5, wherein the outer sleeve is overmolded on the electro-welding element.

7. A coupling according to claim 5, wherein the electro-welding element and the outer sleeve are molded in a single operation in a single mold including an extensible core.

8. A coupling according to claim 5, wherein the outer sleeve is prefabricated and includes portions for receiving said electro-welding electro-welding element.

9. The electro-welding element according to claim 2, wherein said thermoregulation portion constituted by at least one strip of conductive plastic is disposed in line with the sleeves along a generator line which is diametrically opposite to a generator line on which the portions for installing the terminals are situated.

10. The electro-welding element according to claim 2, wherein said at least one cylindrical sleeve is solid.

11. The electro-welding element according to claim 2, wherein said at least one cylindrical sleeve is constituted by a strip disposed in a helix.

12. An electro-welding element for interconnecting two pieces made of plastic, said element having at least one welding portion constituted by an extrinsically conductive plastic including a filler of metal particles, said conductive plastic being injection molded and essentially non-heat recoverable, wherein said element includes power supply portions for receiving power supply terminals, wherein said element includes an integral portion having a shape arranged to provide a thermoregulation effect during welding.

13. An electro-welding element according to claim 12 wherein said element includes at least one thermoregulation portion constituted by a conductive plastic and having a section substantially smaller than a section of said welding portion.

* * * * *